United States Patent [19]

Nabais Conde et al.

[11] Patent Number: 5,517,030
[45] Date of Patent: May 14, 1996

[54] GAS PROPORTIONAL SCINTILLATION COUNTER FOR IONIZING RADIATION WITH MEDIUM AND LARGE SIZE RADIATION WINDOWS AND/OR DETECTION VOLUMES

[76] Inventors: Carlos A. Nabais Conde, Rua Dr. Antonio Jose de Almeida, 226 r/c Drt.; Joaquim Marques Ferreira dos Santos, Quinta da Tulha, Lote 2–3° Drt.; Antonio C. Sena Sao Miguel Benito, Rua Carolina Michaelis, 78–1° Drt., all of P–3000 Coimbra, Portugal

[21] Appl. No.: 244,913
[22] PCT Filed: Oct. 15, 1993
[86] PCT No.: PCT/PT93/00007
 § 371 Date: Jun. 14, 1994
 § 102(e) Date: Jun. 14, 1994
[87] PCT Pub. No.: WO94/09509
 PCT Pub. Date: Apr. 28, 1994

[30] Foreign Application Priority Data

Oct. 15, 1992 [PT] Portugal .................................. 100968

[51] Int. Cl.[6] .................................................. G01T 1/205
[52] U.S. Cl. .................... 250/361 R; 250/374; 250/385.1
[58] Field of Search .............................. 250/363.07, 374, 250/385.1, 361 R, 214 VT

[56] References Cited

U.S. PATENT DOCUMENTS

| | | | |
|---|---|---|---|
| 4,286,158 | 8/1981 | Charpak et al. | 250/374 |
| 4,376,892 | 3/1983 | Charpak et al. | 250/374 X |
| 4,429,228 | 1/1984 | Anderson | 250/374 |

FOREIGN PATENT DOCUMENTS 58-148982 9/1983 Japan .................................. 250/363.07

OTHER PUBLICATIONS

W. H.–M. KU, et al., "Properties of An Imaginag Gas Scintillation Proportional Counter", Nuc. Inst & Met., 196 (1982) 63–67.

*Primary Examiner*—Carolyn E. Fields
*Assistant Examiner*—Edward J. Glick
*Attorney, Agent, or Firm*—Seth H. Ostrow; Frederick H. Rabin

[57] ABSTRACT

Detectors for ionizing radiation (X-rays, gamma rays, electrons, protons, alpha particles, etc. as well as neutrons) of the gas proportional scintillation counter type using techniques to compensate for a loss of scintillation light reaching the photosensor due to solid angle and reflection effects. Two such techniques are disclosed. One technique involves the use of two non-parallel electrically charged grids which produce a radially increasing electric field, thus radially increasing the intensity of the scintillation light. Another technique involves the use of a mask of small opaque dots having a radially decreasing density covering the photosensor, thus radially increasing the intensity of the scintillation light transmitted to the photosensor. The preferred embodiment for X-ray detection consists in a detector, filled with very pure xenon at atmospheric pressure, with a 2.5 cm diameter radiation window (1), a grid with a spherical (2 cm radius) curvature (2) with its edges placed 0.8 cm away from a plane grid which is placed in contact with or close to a photomultiplier tube (4). This photomultiplier has uniform sensitivity in the 170 nm wavelength region. This detector presents an energy resolution of 8.0% for 5.9 keV X-rays.

18 Claims, 3 Drawing Sheets

GAS PROPORTIONAL SCINTILLATION COUNTER FOR IONIZING RADIATION WITH MEDIUM AND LARGE SIZE RADIATION WINDOWS AND/OR DETECTION VOLUMES

SCOPE OF THE INVENTION

The present invention concerns detectors for ionizing radiation, of the gas proportional scintillation counter type for X-rays, gamma rays, electrons, protons, alpha particles as well as other charged particles like deuterons and mesons, or other nuclear radiation like neutrons. With the principles described in the present invention it is possible to build gas proportional scintillation counters with a high energy resolution, even if the radiation windows and/or the detection volumes have dimensions analogous to those of the secondary scintillation sensor, generally a photomultiplier.

PRIOR ART

Radiation detectors of the gas proportional scintillation counter type have been described in the scientific literature since 1967 (C.A.N.Conde and A.J.P.L.Policarpo, "A gas proportional scintillation counter", Nucl. Instrum. Meth. 53 (1967) 7) being the most commonly used type the one that uses two parallel grids (C.A.N. Conde, M.C.M. Santos, M. Fatima A. Ferreira and Celia A. Sousa, "An argon gas proportional scintillation counter with uniform electric field", IEEE Trans. Nucl. Sci. NS-22 (1) (1975) 104). The working principle has been described in detail in the scientific literature (C.A.N.Conde, "The gas proportional scintillation counter: evaluation of performances with interest for analysis by ion beam techniques", Nucl. Instrum. Meth. 149 (1978)685) and is briefly described in the following.

When ionizing radiation is absorbed in a very pure noble gas (typically xenon at atmospheric pressure) it produces a primary electron cloud with a number of electrons which is proportional, within a good approximation, to the energy of the absorbed radiation (F. P. Santos, T.H.V.T. Dias, A. D. Stauffer and C.A.N. Conde, "Variation of energy linearity and w value in gaseous xenon radiation detectors for X-rays in the 0.1 to 25 keV energy range: a Monte Carlo simulation study", Nucl. Instrum. Meth. A307 (1991)347). These electrons are subject to a weak reduced electric field (smaller than 1V/cm/Torr) produced by the application of a voltage (typically 500V) between a plane first grid and the detector window; then the primary electrons drift towards this grid. The region between the detector and the first grid is usually called "drift region". Next to the first grid and parallel to it there is a plane second grid, about 1 cm away. An electric high voltage (typically 5000 Volts) is applied to the second grid which produces a strong electric field with an intensity below or near the threshold for ionization (i.e. 5 V/cm/Torr). Once the primary electrons reach the region between the two grids (the so-called "scintillation region") they excite the noble gas atoms, which in the de-excitation process lead to the production of vacuum ultraviolet light, the so-called "secondary scintillation". One single electron may excite, successively, hundreds of noble gas atoms. Therefore the intensity of the secondary scintillation will be quite large and proportional to the number of primary electrons, i.e. proportional to the energy dissipated by the ionizing radiation in the gas.

The secondary scintillation is detected by a vacuum ultraviolet sensor (generally a photomultiplier) which produces a pulse with an amplitude proportional to the number of primary electrons. Thus, with a multichannel analyzer it is possible to obtain energy spectra, much in the same way as with a standard NaI(Tl) scintillation counter, but with much better energy resolution, at least for X-rays.

The energy resolution of gas proportional scintillation counter is limited by the Fano factor (T.H.V.T.Dias, F. P. Santos, A. D. Stauffer and C.A.N. Conde, "The Fano factor in gaseous xenon: A Monte Carlo calculation for X-rays in the 0.1 to 25 keV energy range", Nucl. Instrum. Meth. A307 (1991) 341) but depends also, amongst other factors on the grid parallelism (C.A.N. Conde, L. F. Requicha Ferreira and M. Fatima A. Ferreira, "The secondary scintillation output of xenon in a uniform field gas proportional scintillation counter", IEEE Trans. Nucl. Sci. NS-24 (1) (1977) 221) and on the non-uniformity of the photomultiplier response (J.M.F. dos Santos, A.C.S.S.M. Bento and C.A.N. Conde, "The effect of the photomultiplier nonuniformity on the performance of GPSCs", Nucl. Instrum. Meth A321 (1992) 238).

For detectors with medium size radiation windows (typically 1 or 2 cm diameter) the amount of light reaching the sensor depends on the radial distance of the point where the electrons enter the scintillation region. This is so since, although the intensity of the secondary scintillation is constant (for parallel grids), the amount that reaches the sensor depends on the solid angle through which it sees the scintillation and on losses due to reflections on the surfaces of the same sensor.

These problems have been discussed recently (J.M.F. dos Santos, A.C.S.S.M. Bento and C.A.N. Conde, "The dependence of the energy resolution of GPSC on the scintillation region to photomultiplier distance" in IEEE Trans Nucl. Sc. NS-39(4) (1992), 541) and it was shown that they may lead easily to pulse amplitude variations as large as 10 or 15%. To these amplitude variations corresponds a deterioration in the energy resolution for radiation beams entering the detector through the full aperture of the window. Solutions for these problems have been described in the literature (D. F. Anderson, O. H. Bodine, R. Novick and R. S. Wolff "A focusing gas scintillation proportional counter" Nucl. Instrum. Meth. 144(1977) 485) which use focusing techniques to bring the drifting electrons closer to the axis of the detector and that through the use of two concentric curved grids vary the scintillation position to photomultiplier distance, in a way that partially compensates for the solid angle effects (R. D. Andresen, E. A. Leimann, A. Peacock and B. G. Taylor, "A large area (300 cm$^2$) gas scintillation proportional counter for X-ray astronomy", IEEE Trans. Nucl. Sci. NS-25 (1) (1978) 800). Another solution calls for the use of large size photomultipliers. Any of these techniques is relatively complex and expensive.

SUMMARY OF THE INVENTION

It is therefore an object of the present invention to provide an improved gas scintillation counter for ionizing radiation with a medium to large size radiation window and/or detection volume.

It is another object of the present invention to compensate for a loss of scintillation light reaching a photosensor in a gas proportional scintillation counter due to either solid angle or reflection effects.

These and other objects of the present invention are achieved with a gas proportional scintillation counter having at least one noble gas-filled enclosure defined by a first grid and a second grid, in which scintillation light such as vacuum ultraviolet light is produced in an electric field between the first and second grids as a result of interaction between the noble gas and one or more electrons entering the at least one enclosure. The counter also has sensor means such as a photomultiplier for detecting the scintillation light and producing a pulse in response to the detected scintillation light. The first grid defining the gas-filled enclosure is at least partly curved so that the scintillation light produced between the curved pm of the first grid and the second grid increases in intensity with increases in radial distance from a center of the curved part of the first grid, thereby compensating for a radially-increasing loss of scintillation light reaching the sensor means due to solid angle and reflection effects.

The objects of the present invention are also achieved with a gas proportional scintillation counter having at least one noble gas-filled enclosure defined by a first grid and a second grid, in which scintillation light is produced as explained above, and a sensor for detecting the scintillation light and producing a pulse in response to the detected scintillation light. To compensate for the loss of scintillation light reaching the sensor, the sensor has an local average efficiency which increases with increases in radial distance from a center of the sensor. In a preferred embodiment, this increasing local average efficiency is produced through the use of a mask of small opaque dots covering the sensor.

DETAILED DESCRIPTION OF THE PREFERRED EMBODIMENTS

In the present invention we present two new solutions to the problems discussed above regarding the loss of scintillation light due to solid angle or reflection effects which are simpler and economically more advantageous than the solutions described above. The solutions here described can even be combined with the above ones, namely the focusing techniques, in the construction of detectors with even larger dimensions.

Figure 1:
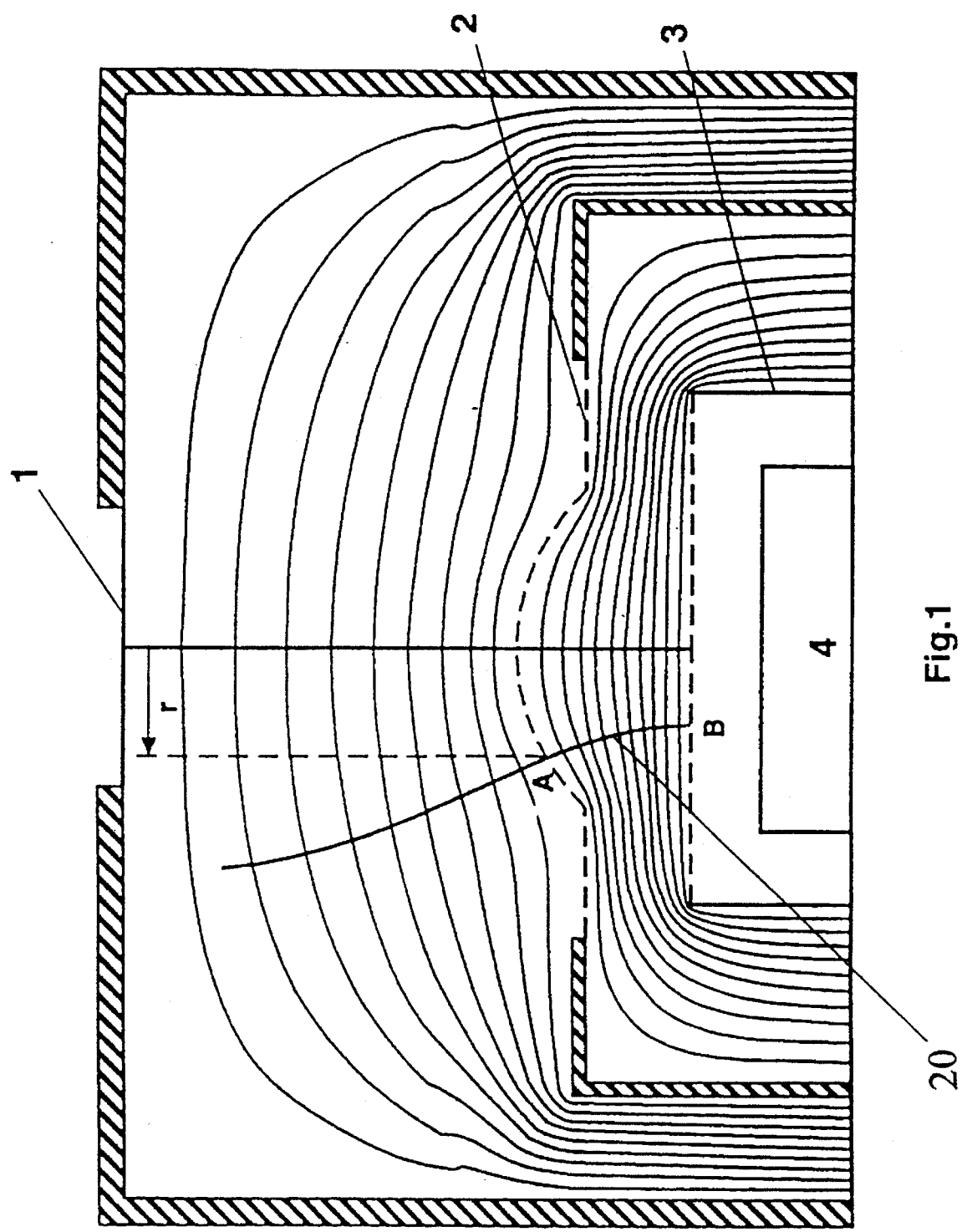
FIG. 1 is a schematic view of a gas proportional scintillation counter utilizing the curved grid technique of the present invention.

1—The first technique consists in the replacement of the first grid (plane) by a curved grid having a special shape; the second grid remains plane and may be placed onto the scintillation sensor or a certain distance away (see FIG. 1). The primary electrons produced by the incident radiation that entered the detector through the thin radiation window (1) drift towards the curved grid (2) and once they cross it they enter the scintillation region, between the plane grid (3) and the curved grid (2), where they meet a non-uniform electric field region. This field has an intensity that increases with the radial distance, r. As the function that represents the intensity of the secondary scintillation versus the electric field intensity is approximately a straight line that does not cross the origin of the axis (C.A.N. Conde, L. F. Requicha Ferreira and M. Fatima A. Ferreira, "The secondary scintillation output of xenon in a uniform field gas proportional scintillation counter", IEEE Trans. Nucl. Sci. NS-24 (1) (1977) 221) the amount of light produced by each primary electron while crossing the scintillation region increases with the radial distance. With a proper curvature for the first grid the reduction with the radial distance in the amount of VUV light that reaches the sensor (photomultiplier) (4) due to solid angle and reflection effects, can be exactly compensated by the increasing amount of light produced and due to the radially increasing electric field intensity. For exact compensation, the amount of light, I (r), detected in the sensor (4) which is produced by a single electron entering the scintillation region at the radial distance, r, must remain constant as r varies from 0 to a certain maximum value, Rmax.

This implies that the following integral remains constant within the same radial range:

$$I(r) = \int_{V1}^{V2} \frac{dn}{ds} \, w(s) \, h(s) \, R(s) \, ds \quad \text{(eq. 1)}$$

where V1 and V2 are the voltages applied to the curved grid (2) and the plane grid (3), respectively.

This integral is calculated along the curvilinear coordinate, s, on a curve defined by an electric field line (20) which starts in the point A of the curved in grid (2) that is at the radial distance, r, and ends in the point B of the plane grid (3), as shown in FIG. 1. dn/ds is the number of secondary scintillation photons, n, produced by unit of path length along the curve defined by the electric field line (20) at the curvilinear coordinate, s; dn/ds is not constant since the electric field intensity varies along the electric field line (20) but it can be calculated using expressions of the type of those already published (C.A.N. Conde, L. F. Requicha Ferreira and M. Fatima A. Ferreira, "The secondary scintillation output of Xenon in a uniform field gas proportional scintillation counter", IEEE Trans. Nucl. Sci. NS-24 (1) (1977) 221).

w(s) is the solid angle through which the electron sees the optical sensor (photomultiplier) from the position defined by the curvilinear coordinate s and R(s) is the average reflectivity of the surfaces of the window of the sensor measured from the same position (J.M.F. dos Santos, A.CoS.S.M. Bento and C.A.N. Conde, "The dependence of the energy resolution of GPSC on the scintillation region to photomultiplier distance" in IEEE Trans. Nucl. Sc. NS-39(4) (1992) ). h(s) is the average quantum efficiency of the sensor as measured from the position defined by the curvilinear coordinate s, In FIG. 1 we plot the equipotential curves in the regions between the window (1) and the curved grid (2) and between this grid and the plane grid (3). All events due to the ionizing radiations referred to above (X' rays, gamma rays, electrons, photons, etc.) that produce primary electrons within an electric field tube starting in the front wall of the detector and ending in the curved grid at r=Rmax, all of them will produce a secondary scintillation pulse in the sensor, with an amplitude that depends only on the number of primary electrons and not on their position. If the distances travelled by the primary electrons are too large, diffusion has to be taken into account. If $R_D$ is the radius of a diffusion cloud at r=Rmax near the curved grid, the electric field tube being discussed is smaller by the amount $R_D$. The detection volume of the detector is equal to the volume of that electric field tube. Whenever the sensor (4) has a uniform quantum efficiency ho, equation 1 reduces to:

$$I(r) = h_0 \int_{V1}^{V2} \frac{dn}{ds} w(s) R(s) ds \qquad (eq.\ 2)$$

The calculation of the shape of the curved grid (2) that keeps I(r) constant between 0 and Rmax can be made within a good approximation by iterative techniques using commercially available electrostatic CAD programmes for the calculation of electric fields between the grids and using the straight line approximation for dn/ds (C.A.N.Conde, L.F. Requicha Ferreira and M. Fatima A. Ferreira, "The secondary scintillation counter", IEEE Trans. Nucl. Sci. NS- 24 (1) (1977) 221)).The calculation of w(s) and R(s) has already been described (J.M.F. dos Santos, A.C.S.S.M. Bento and C.A.N. Conde, "The dependence of the energy resolution of GPSC on the scintillation region to photomultiplier distance", IEEE Trans. Nucl. Sc. NS39(4) (1992)).

Figure 3:
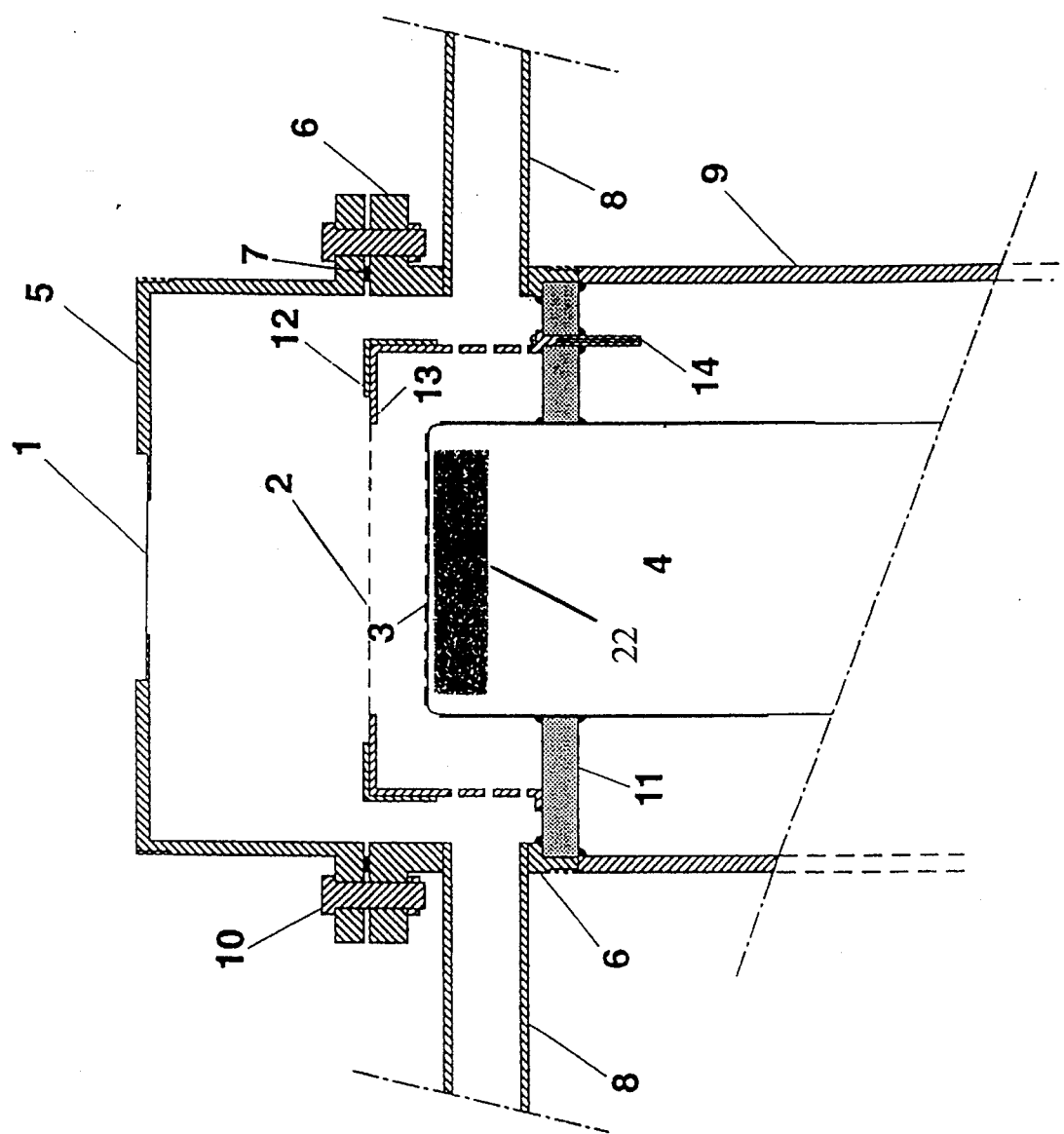
FIG. 3 is a schematic cross-sectional view of a gas proportional scintillation counter utilizing the partially masked sensor technique of a preferred embodiment of the present invention.

2—With reference to FIG. 3, an alternative solution to keep I(r) constant consists in the use of a gas proportional scintillation counter with parallel grids (2') and (3), which implies dn/ds constant, but using a sensor (4) with an efficiency ho(r) that increases radially. In this case we have $$I(r) = \frac{dn}{ds} \int_{V1}^{V2} w(s) h(s) R(s) ds \qquad (eq.\ 3)$$

The required radial variation for $h_0(r)$ may be obtained starting with a uniform efficiency sensor, or with an uniformized one using the techniques of Mead and Martins (J. B. Mead and J. P. Martins, "Improvement of resolution in large area photomultipliers", Nucl. Instr. Meth. 36(1965)13) and covering it with a mask of small opaque dots (22) (for example using photolithography and/or vacuum evaporation techniques to deposit small metallic (e.g. chromium) circles). The density of dots (22) onto the sensor (4) will be adjusted so that $h_0(r)$ will have the required variation. Once w(s) and R(s) are calculated (usually by the Monte Carlo method) the quantum efficiency of the sensor along its surface $h_0(r)$ may be calculated within a good approximation by using iterative techniques and a Monte Carlo method to calculate equation 3 and keep it constant.

Figure 2:
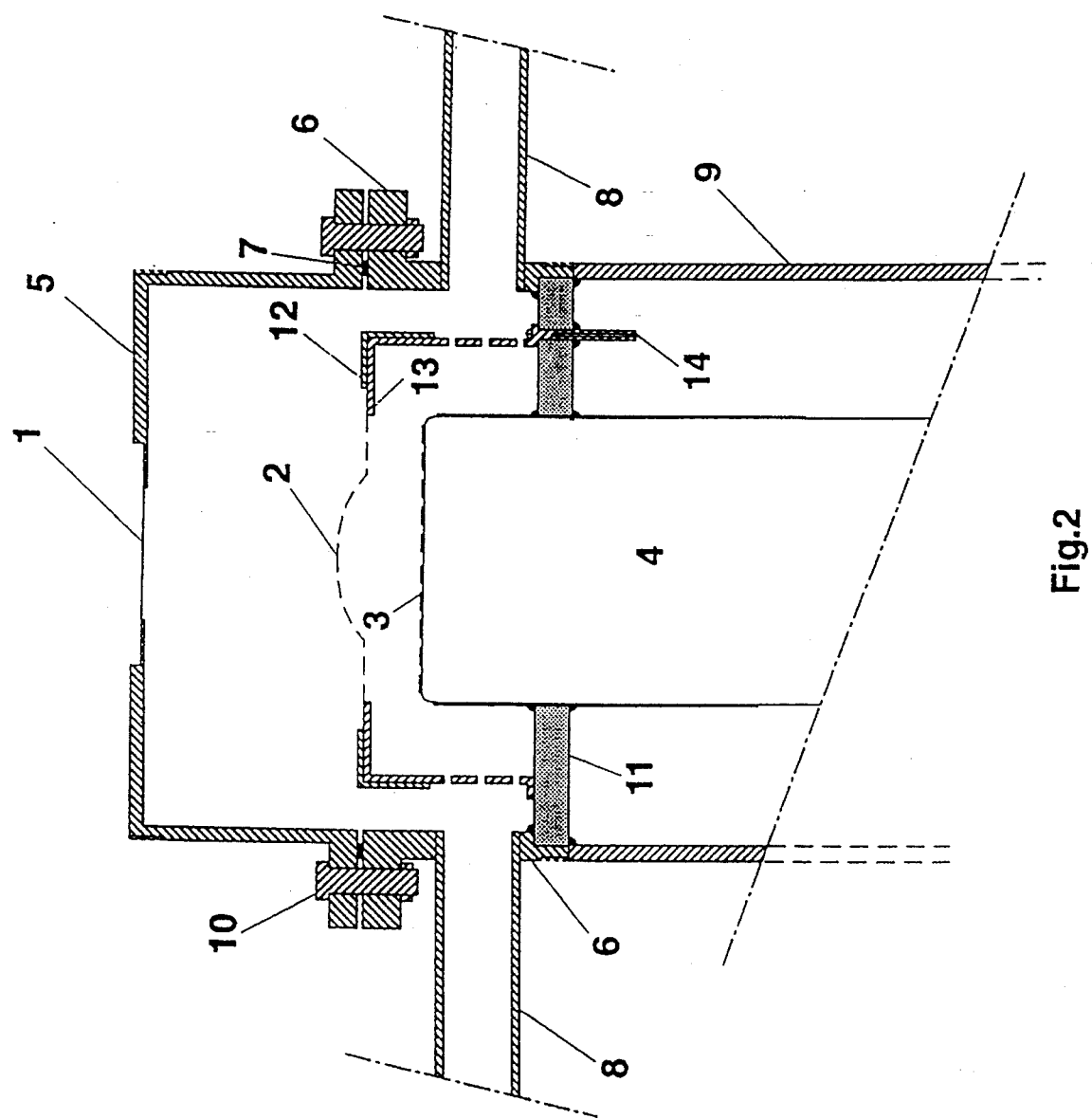
FIG. 2 is a schematic cross-sectional view of a gas proportional scintillation counter utilizing the curved grid technique of a preferred embodiment of the present invention.

A preferred embodiment of the present invention has cylindrical geometry and is shown in FIG. 2. The enclosure of the detector, pieces (5), (6) and (9) is made of a metal, in the present case stainless steel, with a low outgassing so to reduce the impurification of the filling gas. Pieces (5) and (6) are tightened against each other with screws (10) and the system is made vacuum tight with an indium gasket (7). Piece (9) is a stainless steel cylinder that encloses the photomultiplier (4) and that fits in the lower part of piece (6) with a thread. Piece (11) is made in a insulating material with good characteristics for vacuum like a machinable vacuum tight ceramic which in the preferred embodiments is ceramic material available under the trademark MACOR®; this piece is epoxied to the lower part of piece (6) with a low vapor pressure epoxy (TRACON Model 2116).

The radiation window (1) is made of a 50 microns thick low outgassing film which in the preferred embodiments is film available under the trademark KAPTON®, epoxied (with the low vapor pressure epoxy) to the central part of piece (5), and with a vacuum deposited thin aluminum film in the inner side for electrical conductivity. The curved grid (2) is made of a square mesh with stainless steel wire (80 microns in diameter) and with the centers of the wire 930 microns apart (made by GANTOIS in France). This meshed grid is assembled by compressing a circular mesh piece between the two stainless steel pieces (12) and (13) and the proper spherical calotte shape is achieved by compression the grid between stainless steel molds with the proper shape. In the present case the calotte radius is 20 mm and the highest point of the curved grid (2) is placed 15 mm away from the plane grid (3). The sensor is a photomultiplier with 5.1 cm diameter having a high purity quartz window (so to let most of the vacuum ultraviolet secondary scintillation of the gas, xenon, to pass). The photomultiplier is in the present case an EMI D676QB one. The plane grid (3) is a chromium grid vacuum deposited onto the photomultiplier window and has 100 microns wide lines, spaced 1500 microns, in two perpendicular directions. This grid allows a good optical transmission (about 87%). The grid pattern is made by vacuum depositing first the "horizontal" lines with a mask with parallel bars and afterwards the "vertical" lines with the same mask turned 90 degrees. The lateral surface of the photomultiplier is fully covered with a chromium film which is used to feed the high voltage from the outside to the plane grid (3). Pieces (9) are stainless steel tubes for gas filling, in the present case xenon at room temperature and at a pressure of 1.2 bar. The xenon gas is continuously purified with getters (SAES ST 707) and circulates by convection. However if instead of using epoxy techniques for joining the different pieces we use metal to glass and metal to ceramic joining techniques together with ultra high vacuum techniques with outgassing, no continuous purification of the noble gas will be required. For the embodiment just described concerning the shape and geometry of the grids and xenon.

For the shape and geometry of the grids and xenon pressure of the embodiment just described, the condition of equation 2 is achieved when a positive voltage of 700 V is applied to the curved grid (2) (fed with a metallic contact (14) through ceramic MACOR® piece (11) ) and when a positive voltage of 4400V is applied to the plane grid (3). Under these conditions I(r) remains constant up to a radial distance Rmax=14 mm.

The photomultiplier is biased with a positive voltage of 5100V to the anode and 4400V to the photocathode, so that there is no voltage difference across the photomultiplier window. The dynodes of the photomultiplier are polarized with a classical resistances circuit.

The curved grid gas proportional scintillation counter embodiment just described achieves an energy resolution of 8.0% for 5.9 keV uncollimated X-rays with radiation windows 25 mm in diameter.

Concerning technique 2, a preferred embodiment of which is shown in FIG. 3, (a parallel plane grids detector with a sensor (4) with radially variable efficiency) calculated results for parallel grids (2') and (3) 10 mm apart with grid (3) deposited onto the 2 mm thick quartz photomultiplier window having a photocathode 46 mm in diameter, and with the mask of chromium dots (22) also deposited onto the photomultiplier window, as described above, show that the condition for equation 3 to remain constant up to Rmax=46 mm is that the efficiency ho(r) increases with the radius according the numerical expression $$ho(r) = 1.6671414 \times 10^{-11} r^8 + 0.48 \qquad (eq.\ 4)$$

We claim:

1. A gas proportional scintillation counter comprising:

at least one gas-filled enclosure;

sensor means for detecting scintillation light produced in the at least one gas-filled enclosure in response to radiation; and compensation means for compensating for a loss of scintillation light reaching the sensor means due to solid angle or reflection effects.

2. The gas proportional scintillation counter of claim 1 further comprising a radiation window having a diameter of at least approximately 25 mm.

3. The gas proportional scintillation counter of claim 1 wherein the at least one enclosure is defined by at least a first and second grid and the compensation means comprises at least a partial curvature of the first grid so that the scintillation light produced in the at least one enclosure between the curved part of the first grid and the second grid increases in intensity with increases in radial distance from a center of the curved part of the first grid.

4. The gas proportional scintillation counter of claim 1 wherein the compensation means comprises a varying density mask of substantially opaque dots covering the sensor means such that a local average efficiency of the sensor means increases with increases in radial distance from a center of the sensor means.

5. The gas proportional scintillation counter of claim 1 wherein the at least one enclosure is defined at least by a first and second grid and wherein the compensation means comprises means for keeping the amount of scintillation light detected by the sensor means substantially constant with increases in radial distance from a center of the sensor means wherein the amount of scintillation light detected by the sensor means is calculated in accordance with the following equation:

$$I(r) = \int_{V1}^{V2} \frac{dn}{ds} w(s) h(s) R(s) \, ds$$

wherein:

r is the radial distance from a center of the first grid;

I(r) is the amount of scintillation light detected by the sensor means produced by a single electron entering the at least one enclosure at a radial distance r along the first grid;

n is a number of photons in the scintillation light;

s is a curvilinear coordinate of the single electron along a curve defined by an electric field line starting at a point on the first grid at a radial distance r and ending at a point on the second grid;

dn/ds is the number n of scintillation light photons produced per unit path length along the curve defined by the electric field line, at the coordinate s;

V1 and V2 are voltages applied to the first and second grids, respectively;

w(s) is a solid angle through which the single electron sees the sensor means from coordinate s;

h(s) is an average quantum efficiency of the sensor means as measured from coordinate s; and R(s) is an average reflectivity of a surface of the sensor means as measured from coordinate s.

6. A gas proportional scintillation counter comprising:

at least one noble gas-filled enclosure defined by at least a first grid and a second grid, in which scintillation light is produced in an electric field between the first and second grids as a result of interaction between the noble gas and one or more electrons entering the at least one enclosure; and sensor means for detecting the scintillation light and producing a pulse in response to the detected scintillation light;

wherein the first grid is at least partly curved so that the scintillation light produced between the curved part of the first grid and the second grid increases in intensity with increases in radial distance from a center of the curved part of the first grid, so as to compensate for a radially-increasing loss of scintillation light reaching the sensor means due to at least one of solid angle and reflection effects.

7. The gas proportional scintillation counter of claim 6 wherein the second grid is planar.

8. The gas proportional scintillation counter of claim 6 wherein the curved part of the first grid has a curvature calculated so that the amount of scintillation light detected by the sensor means remains substantially constant with increases in the radial distance from the center of the curved part of the first grid.

9. The gas proportional scintillation counter of claim 8 wherein the amount of scintillation light detected by the sensor means is calculated in accordance with the following equation:

$$I(r) = \int_{V1}^{V2} \frac{dn}{ds} w(s) h(s) R(s) \, ds$$

wherein:

r is the radial distance from the center of the curved part of the first grid;

I(r) is the amount of scintillation light detected by the sensor means produced by a single electron entering the at least one enclosure at a radial distance r along the first grid;

n is a number of photons in the scintillation light;

s is a curvilinear coordinate of the single electron along a curve defined by an electric field line starting at a point on the first grid at a radial distance r and ending at a point on the second grid;

dn/ds is the number n of scintillation light photons produced per unit path length along the curve defined by the electric field line, at the coordinate s;

V1 and V2 are voltages applied to the first and second grids, respectively;

w(s) is a solid angle through which the single electron sees the sensor means from coordinate s;

h(s) is an average quantum efficiency of the sensor means as measured from coordinate s; and R(s) is an average reflectivity of a surface of the sensor means as measured from coordinate s.

10. The gas proportional scintillation counter of claim 9 wherein the sensor means has a substantially uniform quantum efficiency so that h(r) is substantially equal to a constant $h_0$.

11. The gas proportional scintillation counter of claim 8 wherein the curved part has a spherical calotte shape with a radius of approximately 20 mm.

12. A gas proportional scintillation counter comprising:

at least one noble gas-filled enclosure defined by at least a first grid and a second grid, in which scintillation light is produced in an electric field between the first and second grids as a result of interaction between the noble gas and one or more electrons entering the at least one enclosure; and sensor means for detecting the scintillation light and producing a pulse in response to the detected scintillation light;

wherein the sensor means has a local average efficiency which increases with increases in radial distance from a center of the sensor means, so as to compensate for a radially-increasing loss of scintillation light reaching the sensor means due to at least one of solid angle and reflection effects.

13. The gas proportional scintillation counter of claim 12 wherein the first and second grids are planar and are arranged in parallel.

14. The gas proportional scintillation counter of claim 12 wherein the sensor means comprises a sensor with a uniform efficiency which is partially covered with a varying density mask of substantially opaque dots.

15. The gas proportional scintillation counter of claim 12 wherein radially increasing efficiency of the sensor means is calculated so that the amount of scintillation light detected by the sensor means remains substantially constant with increases in the radial distance from the center of the sensor means.

16. The gas proportional scintillation counter of claim 15 wherein the amount of scintillation light detected by the sensor means is calculated in accordance with the following equation:

$$I(r) = \int_{V1}^{V2} \frac{dn}{ds} w(s) \, h(s) \, R(s) \, ds$$

wherein:

r is the radial distance from the center of the first grid;

I(r) is the amount of scintillation light detected by the sensor means produced by a single electron entering the at least one enclosure at a radial distance r from the center of the first grid;

n is a number of photons in the scintillation light;

s is a curvilinear coordinate of the single electron along a curve defined by an electric field line starting at a point on the first grid at a radial distance r and ending at a point on the second grid;

dn/ds is the number n of scintillation light photons produced per unit path length along the curve defined by the electric field line, at the coordinate s;

V1 and V2 are voltages applied to the first and second grids, respectively;

w(s) is a solid angle through which the single electron sees the sensor means from coordinate s;

h(s) is an average quantum efficiency of the sensor means as measured from coordinate s; and R(s) is an average reflectivity of a surface of the sensor means as measured from coordinate s.

17. The gas proportional scintillation counter of claim 16 wherein the first and second grids are planes arranged substantially in parallel such that dn/ds is substantially equal to a constant.

18. The gas proportional scintillation counter of claims 6 or 12 wherein the pulse produced by the sensor means has an amplitude which is proportional to the number of electrons entering the at least one enclosure.

* * * * *